UNITED STATES PATENT OFFICE.

FRANCIS M. MARSHALL, OF STOCKHOLM, SWEDEN.

EXPLOSIVE.

993,534.      Specification of Letters Patent.      Patented May 30, 1911.

No Drawing.      Application filed September 24, 1910. Serial No. 583,578.

*To all whom it may concern:*

Be it known that I, FRANCIS M. MARSHALL, a subject of King George of England, residing at Stockholm, Sweden, have invented new and useful Improvements in Composition of Matter to be Used as an Explosive, of which the following is a specification.

My composition consists of the following ingredients combined substantially in the proportions stated, viz.

| | |
|---|---|
| Zinc | 1% to 5% |
| Perchlorate of ammonia | 30% to 40% |
| Saltpeter, (nitrate of an alkali metal) | 35% to 45% |
| Dinitrotoluol (or its chemical equivalents) | 8% to 15% |
| A compound containing carbon in highly combustible form, (preferably pine sawdust) | 8% to 15% |

These ingredients or their chemical equivalents are to be separately prepared in powdered form and are to be thoroughly mixed in a dry condition. The addition of zinc, etc., to the mixture of the other ingredients imparts to the mixture its shattering power.

This mixture is intended to be used in cartridges or other suitable retainer. It is lighter than dynamite cartridges of the same size and explosive power, having a weight substantially in the proportion of 12 to 17 as compared with the weight of the dynamite cartridges, and the cost of manufacture is much less.

Where my improved explosive is to be used in water, it must be kept dry in the cartridges, which are preferably formed of, or covered with waxed paper.

No poisonous gases are generated by combustion.

Having thus described my invention, what I claim as new, and desire to secure by Letters Patent, is—

1. The herein described explosive, consisting of zinc, perchlorate of ammonia, saltpeter, dinitrotoluol, and sawdust, substantially as described.

2. The herein described explosive, consisting of 1% to 5% of zinc, 30% to 40% of perchlorate of ammonia, 35% to 45% of saltpeter, 8% to 15% of dinitrotoluol, and 8% to 15% of sawdust, substantially as described.

In testimony whereof I affix my signature in the presence of two witnesses.

FRANCIS M. MARSHALL.

Witnesses:
    TORVALD NYSTRÖM,
    INGEBORG HENRIKSSON.